US00RE34315E

United States Patent [19]

Goodman

[11] E Patent Number: Re. 34,315

[45] Reissued Date of Patent: Jul. 20, 1993

[54] REMOTE MIXTURE CONTROL TOOL

[76] Inventor: Lynn R. Goodman, 412 Terry Point, Fort Collins, Colo. 80524

[21] Appl. No.: 666,150

[22] Filed: Mar. 5, 1991

Related U.S. Patent Documents

Reissue of:

[64] Patent No.: 4,809,539
Issued: Mar. 7, 1989
Appl. No.: 210,352
Filed: Jun. 22, 1988

[51] Int. Cl.[5] ..... G01M 15/00
[52] U.S. Cl. ..... 73/116; 123/198 A
[58] Field of Search ..... 73/118.1, 117.1, 116; 123/198 A; 261/DIG. 56

[56] References Cited

U.S. PATENT DOCUMENTS

| | | | |
|---|---|---|---|
| 664,025 | 12/1900 | Nash . | |
| 1,877,937 | 9/1932 | Moore . | |
| 2,092,685 | 9/1937 | Viel . | |
| 2,504,361 | 4/1950 | Van Hartesveldt . | |
| 2,715,392 | 8/1955 | Grevas . | |
| 2,755,663 | 7/1956 | Smith et al. | 73/116 |
| 3,437,081 | 4/1969 | Mennesson | 123/119 |
| 3,472,067 | 10/1969 | Chew | 73/116 |
| 3,710,770 | 1/1973 | Newkirk et al. | 123/120 |
| 3,739,760 | 6/1973 | Charron | 123/127 |
| 3,969,932 | 7/1976 | Rieger et al. . | |
| 3,987,774 | 10/1976 | Waag | 123/139 AJ |
| 4,019,477 | 4/1977 | Overton | 123/127 |
| 4,030,349 | 6/1977 | Blanke et al. | 73/116 |
| 4,031,747 | 6/1977 | Blanke | 73/116 |
| 4,033,170 | 6/1977 | Kawamura et al. . | |
| 4,088,102 | 5/1978 | Kato | 123/119 R |
| 4,116,053 | 9/1978 | Blanke | 73/117.3 |
| 4,164,142 | 8/1979 | Blanke | 73/118.1 |
| 4,175,427 | 11/1979 | Blanke . | |
| 4,305,350 | 12/1981 | Brown et al. | 123/59 PC |
| 4,338,905 | 7/1982 | Urich | 123/525 |
| 4,354,475 | 10/1982 | O'Toole et al. | 123/525 |
| 4,399,697 | 8/1983 | Kohama et al. . | |
| 4,404,846 | 9/1983 | Yamauchi et al. . | |
| 4,502,325 | 3/1985 | Klomp . | |
| 4,510,795 | 4/1985 | Sumal . | |
| 4,524,033 | 6/1985 | Elledge | 261/18 B |
| 4,571,990 | 2/1986 | Hönig . | |
| 4,571,991 | 2/1986 | Abe et al. . | |
| 4,586,367 | 5/1986 | Lewis . | |
| 4,593,671 | 6/1986 | Boone | 123/572 |
| 4,691,562 | 9/1987 | Abthoff et al. | 73/118.1 |

FOREIGN PATENT DOCUMENTS

| | | | |
|---|---|---|---|
| 4923 | 1/1977 | Japan | 123/198 A |

*Primary Examiner*—Jerry W. Myracle
*Attorney, Agent, or Firm*—Lowell Anderson

[57] ABSTRACT

A mixture control device is disclosed that is used to test internal combustion engines. The device is usually temporarily installed on an engine to test catalytic converters, to clean internal engine parts, or to determine specific operating problems with an engine. The device can also be used as a teaching aid to show different operating conditions without making permanent or difficult adjustments. The device can also be used in racing applications to allow a driver to adjust the mixture of an engine, while on the course, to ensure peak efficiency under varying race conditions. The device consists of a housing that has a plenum formed within its center. The plenum runs the entire length of the housing. A venturi port is also formed on the housing and it feeds fuel and air into the plenum for injection into an engine. Fuel is supplied through an internal tank and is supplied to the venturi port through a small hose and a needle valve assembly. The fuel tank has a two different outlet ports to allow convenient placement of the device during use. Two valves control the amount of air and air-fuel mixture that are injected into the engine. An outlet port is fastened to one end of the device to allow the user to inject the supplemental mixture into any convenient port on a vehicle.

17 Claims, 4 Drawing Sheets

REMOTE MIXTURE CONTROL TOOL

Matter enclosed in heavy brackets [ ] appears in the original patent but forms no part of this reissue specification; matter printed in italics indicates the additions made by reissue.

This invention is related to remote fuel mixture control devices used in engine testing, cleaning and performance evaluation.

BACKGROUND OF THE INVENTION

Since the mid 1970's, automobiles and other vehicles have had environmental controls installed to reduce the levels of pollutants released into the air. Many states now monitor the levels of emissions from vehicles to ensure that environmental standards are being met. Although testing devices, such as the type disclosed in U.S. Pat. No. 4,175,427 to Blanke, are helpful in monitoring pollutants, one important device, the catalytic converter can not readily be tested, although an accepted test has been developed. This test uses four output gasses to determine the effectiveness of the engine and the pollution controls.

The Blanke Patent discusses the primary reason that catalytic converter tests aren't done: in order to perform the test, the vehicles's engine must be adjusted and then reset. Although the Blanke patent discussed this problem, it states that it is beyond the scope of his disclosure.

To understand the procedure for testing a catalytic converter, it is necessary to discuss what a typical engine does. Theoretically, if gasoline is burned completely with oxygen ($O_2$) in an internal combustion engine, the products produced by the combustion are water vapor and carbon dioxide ($CO_2$). In fact, the theoretical products are never fully produced because engines do not usually run at their peak efficiency. Typically, an engine usually produces a mix of carbon monoxide (CO), $CO_2$, $O_2$, various hydrocarbon gases, and water vapor. Depending on the operating performance of any given engines, the percentage output of the four gases (CO, $CO_2$, $O_2$, and hydrocarbons) can vary considerably. Under ideal conditions, however, an engine operating at peak efficiency with a working catalytic converter will reduce $O_2$ and CO output because these gases will be combined into additional $CO_2$. $Co_2$ output will be maximized and residual hydrocarbon output should be near zero. If $CO_2$ output is maximized, $O_2$ output is minimized and hydrocarbons are eliminated, a catalytic converter passing gretaer than 0.5% Co is defective. This test will show proper results only if $CO_2$ production exceeds 13.6% and $O_2$ output is slightly above 1.0% (typically 1.2-1.6%). At this level of performance, residual hydrocarbons are reduced to a minimum. A complete discussion of this theory and application can be found in the report MGA-90 by Sun Electric Corporation; The California Bureau of Automotive Repair memorandum dated June 10, 1985; and Catalytic Convertor Test Proposal, Municipality of Anchorage, Vehicle Inspection Program.

In order to achieve the output levels needed to ensure a proper test, the fuel air mixture feeding an engine must be adjusted to either lean or rich, as needed, until the output of the engine matches the test criteria. In all late model vehicles, this cannot be done without adjusting the carburetor or injection system. Recent car models have factory sealed adjustment screws making these adjustment difficult and problematic. Once these adjustment screws are adjusted, they must be precisely reset in order to ensure proper engine performance. Because this is a time consuming and skillful procedure, it is not practical to use this method to test catalytic converters with present day equipment.

BRIEF DESCRIPTION OF THE INVENTION

The present invention is designed to eliminate the difficulty in testing catalytic converters as well as providing additional testing and engine cleaning jobs. The invention consists of a remote mixture control tool that can be used to insert either additional fuel, air, or a mixture of fuel and air into the manifold of an engine. The device is able to quickly adjust the mixture of fuel or air or both with adjustment knobs. Use of this tool enables tests of catalytic converters to be completed in a matter of minutes.

The tool consists of a generally rectangular housing. The housing has a small fuel tank formed within the base of the tool. The tank has outlet plugs and back pressure plugs to enable it to be used in either an upright or inverted position. The center portion of the housing is hollow and forms a plenum for additional air. One end of the plenum is capped with a ball and spring assembly to prevent backfires. The cap also forms an outlet plug and is also hollow to allow air to flow as needed. The air flow is adjusted by a valve inserted in the plenum. This valve is controlled by a large knob and enables the user to allow a range of air flow from full flow to completely shut off. At the top of the housing is a fuel injection nozzle that extends into the air plenum. This nozzle forms a venturi. A needle valve is positioned within the nozzle. The needle valve is connected to the fuel tank by a small hose. The fuel flow is controlled by a second valve placed within the nozzle. The second valve is also controlled by a knob and allows the user to adjust the amount of fuel flowing into the plenum over a range extending from no fuel flow at all, to the maximum fuel flow allowed by the setting of the needle valve. The needle valve can be adjusted as needed to increase or decrease the amount of fuel available at the nozzle.

By inserting either fuel or air into the manifold, a mechanic can change the performance characteristics of an engine without making permanent changes to the engine. This device can be used, as will be discussed below, to adjust the mixture of an engine until the desired output is reached. The device can also be used to adjust the mixture of a racing engine while it is running on the trackto maximize engine efficiency. The device can also be used as a teaching tool because it can be used to change an engine's performance to simulate poor performance as well as diagnose engine problems. The device can also be used to clean the interior of an engine by substituting a cleaning fluid in the tank and forcing it into the engine.

It is an object of this invention to produce a remote mixture control tool to enable simple tests of catalytic converters. It is another object of this invention to produce a remote mixture control tool that can be used to diagnose engine problems. Another object of this invention is to produce an educational tool that can be used to simulate engine difficulties in a safe, convenient and non intrusive manner. It is yet another object of this invention to produce an engine cleaning device that is safe and easy to use.

DETAILED DESCRIPTION OF THE INVENTION

Figure 1:
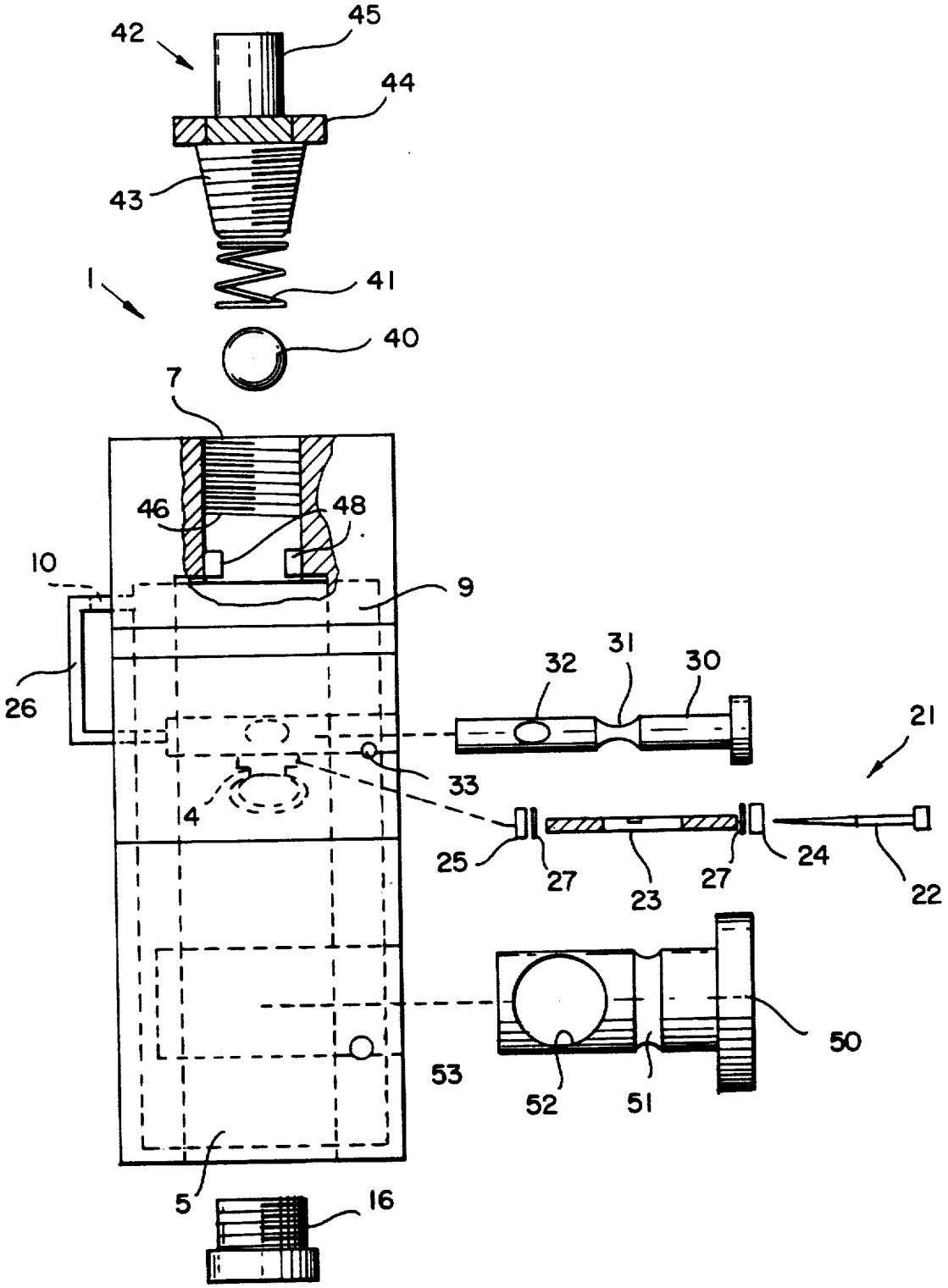
FIG. 1 is an exploded top view of the invention.
Figure 2:
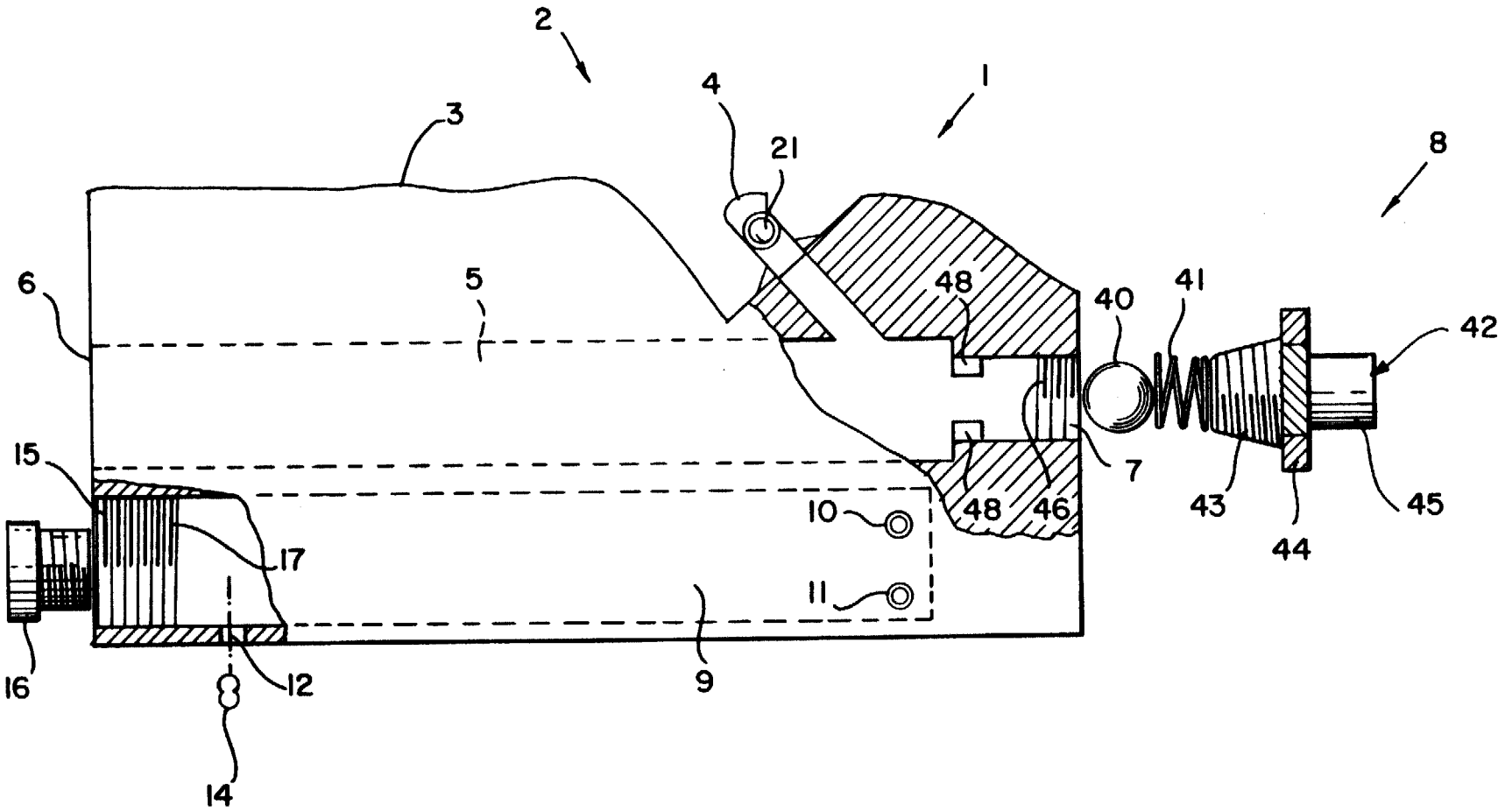
FIG. 2 is a left side view of the invention showing details of the fuel outlet and fuel tank.
Figure 3:
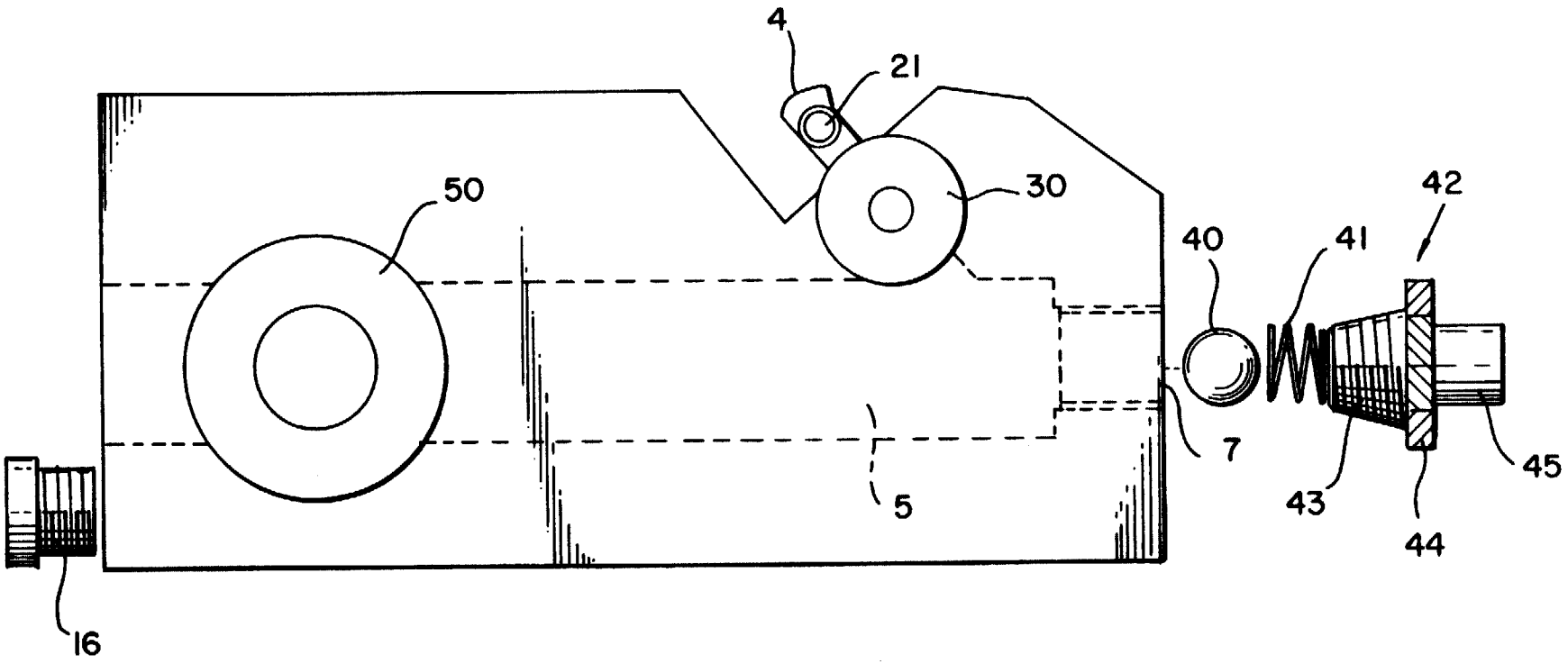
FIG. 3 is a right side view of the invention with the control knobs in place.

Referring now to the drawings, and particularly to FIGS. 1 and 2, the device consists of a housing 1. The housing 1 has a flat bottom and a sculpted top as shown. The housing 1 is divided into three main parts, which are integral within the housing 1. The first part is the top section 2. The top section 2 is shaped as shown and has a sculpted portion 3 that is formed to fit comfortably in the palm of a hand. The top section 2 also contains an atomizing venturi and fuel volume needle assembly 4, which will be described in detail below.

The second section 5 is a plenum that extends the entire length of the tool. The inlet end 6 is completely open and the outlet end 7 is fitted with a spark arrester-anti backfire assembly 8. This assembly will also be discussed below in greater detail.

Figure 4:
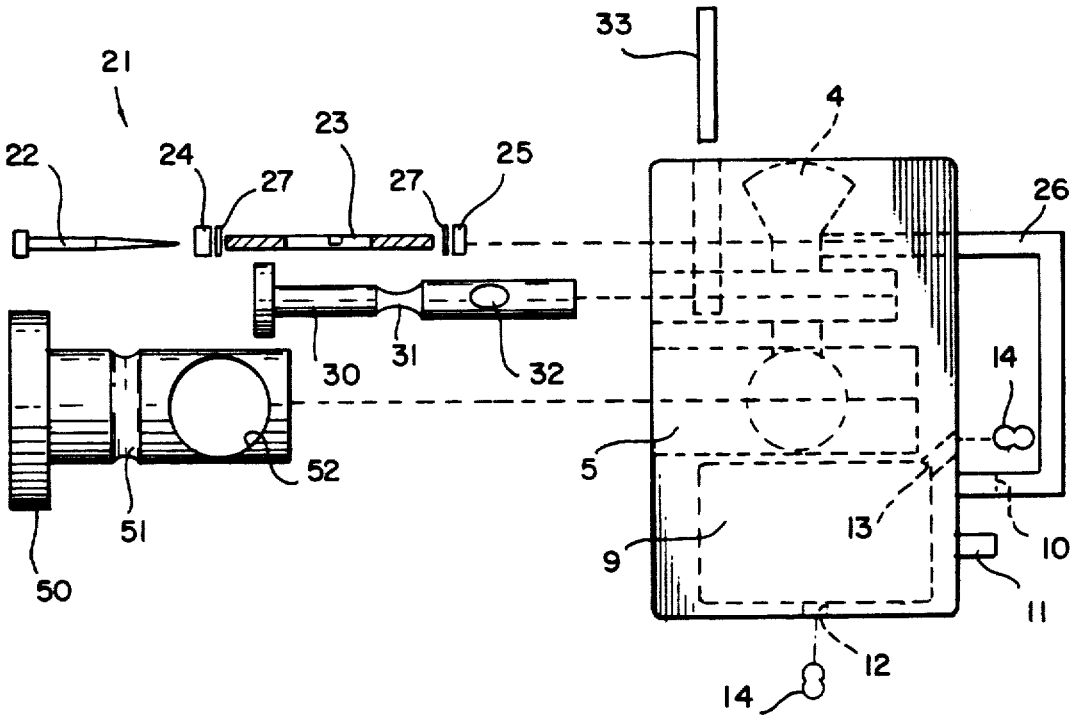
FIG. 4 is a front exploded view of the invention.

Within the third section of the device is an integral fuel tank 9. This tank can be filled with gasoline for mixture adjustments or with cleaning solvents, when using the tool as an engine cleaner. The tank 9 is fitted with two outlet nipples 10 and 11 two nipples are provided to allow the device to be used in an inverted position. When one nipple is in use, the other nipple is securely capped to prevent spillage. The tank 9 also has two back pressure vents 12 and 13 as shown in FIG. 4. Vent 12 is plugged with a plug 14 and vent 13 is opened when the device is used in an upright manner. In the inverted position, vent 12 is opened and vent 13 is plugged with a plug 14. Fuel or solvent is placed within the tank 9 through a fill spout 15, which is sealed with cap 16. The cap 16 is threaded and will engage the female threads 17 that are cut into the plenum 5 of housing 1.

Fuel or solvent (depending on the use of the device) is injected into the plenum 5 as desired through the atomizer venturi 4 as shown. The venturi 4 is formed as part of the housing 1. The venturi 4 is hollow to allow enough air flow through the venturi to ensure that the fuel or solvent is properly atomized. Fuel is injected into the venturi through a needle valve assembly 21, which runs perpendicularly to, and is installed within the venturi 4. The needle valve assembly 21 is a standard valve having a needle portion 22, an outlet barrel portion 23, lock nuts 24 and 25, and washers 27. The needle valve assembly 21 is place into the venturi 4 as shown. A hose 26 is place at the inlet end of the outlet barrel 23 at nut 25. The hose 26 is then connected to either nipple 10 or 11 on the fuel tank 9 as needed.

A control knob 30 is inserted below the venturi 4 as shown. The control knob 30 is generally cylindrical in shape and has a groove 31 cut into the cylinder as shown. An outlet hole 32 is provided in the cylinder as shown. The outlet hole 32 passes through the cylinder and is used as a control valve for the fuel injection into the plenum 5. The control knob 30 controls the air flow through the venturi 4. When the outlet hole 32 is aligned with the venturi 4, maximum air flow and thus the maximum fuel flow into the plenum 5 will occur. As the outlet hole 32 is turned perpendicular to the venturi 4, less air and less fuel will flow into the plenum 5 until ultimately, the flow is stopped entirely. In this manner, fuel or solvent can be injected into the plenum 5 in any amount by simply adjusting the position of the control knob 30. The control knob 30 is held in place by a plug 33 as shown. The plug 33 is wedged into the groove 31 and is passed through the housing 1. In this manner, the control knob 30 is free to turn, but cannot be pulled out of the housing 1 accidentally. Use of the control knob 30 eliminates the need to constantly adjust the needle valve 21 to obtain the best results. The device can be set up with the control knob 30 fully open and the needle valve 21 can then be set to allow whatever flow of fuel or solvent is desired. Once the needle valve 21 is set in this manner, it need not be adjusted further; all of the necessary fuel control is done with the control knob 30.

The spark arrester-backfire protector assembly 8 is shown in FIG. 2. This assembly consists of a spark arrester ball 40, a retaining spring 41, and a nozzle 42. The nozzle 42 has male threads 43 which engage the female threads 46, which are inscribed in the walls of the plenum 5 as shown. The nozzle 42 also has a tightening nut 44 and an outlet conduit 45 as shown. The spark arrester-backfire protector assembly 8 is installed in the plenum 5 by placing the spark arrester ball 40 into the plenum 5. Two retaining ribs 48 will retain the ball 40 within the outlet and prevent the ball 40 from entering the plenum 5. The retaining spring 41 further acts to restrain the ball 40 and allows the spark arrester ball 40 to be pulled from the restraining ribs 48 when the device is under vacuum on the engine. The nozzle 42 is then screwed into the plenum 5 to secure the spark arrester-backfire protector assembly 8 in place.

Air flow through the plenum 5 is controlled by a second control knob 50 which is installed within the plenum cavity as shown. The control knob 50 has a groove 51 and a port 52 similar to those found in the first control knob 30. The second control knob 50 is restrained by pin 53, which is inserted through the housing 1 and wedged into the groove 51 in the same manner as control knob 30 is restrained. Like the atomizer venturi 4, air flow through the plenum 5 can be controlled to allow for the maximum air flow through the plenum 5 to having no air flow through the plenum 5 at all.

The housing 1 and the control knobs 30 and 50 are constructed of non-fuel susceptible plastic. The needle valve assembly 21 is constructed of brass or other suitable material.

The intended purpose of the device is to adjust the fuel air mixture by remote control, rather than by adjusting the carburetor or the fuel injection system. Mixture adjustments can be used to test catalytic converters, which will be discussed in greater detail below, as well as teach auto mechanics, for example. Students can see and hear the effects of different engine settings under controlled conditions.

The device is used by connecting the nozzle to a vacuum port on an engine. Typically, this can be done at either the PCV system or the power brake system, for example. Once a port is selected and the nozzle is installed, the mechanic can then adjust the fuel control knob 30 or the air control knob 50 to change the fuel-air mixture of the engine for whatever purpose. It is possible to install the device in the dashboard of a race car, for example, with this installation, the driver can adjust the air-fuel mixture to the engine while driving in a race. In this manner, the engine can be maintained at optimum efficiency through the race.

Testing catalytic converters can be done using the device by first ensuring that the engine is tuned properly and is operating within normal operating limits. The four output gasses are then measured to determine the base output of the engine. For example a 1984 Plymouth 2.2 liter engine produced initial values of:

CO: 0.00%
HC: 9 ppm
$CO_2$: 12.4%
$O_2$: 2.0%

The device was installed and the mixture was leaned to achieve the following results:

CO: 0.00%
HC: 161 ppm
$CO_2$: 9.8% $O_2$: 5.1%

The device was then used to make the mixture rich to enable the catalytic converter test. The fuel knob was adjusted until the optimum outputs of $CO_2$, $O_2$ and HC were reached. The CO reading was then established:

CO: 0.06% (less than 0.5% indicates good)
HC: 0 ppm (must ensure minimum HC)
$CO_2$: 14.7% (maximum $CO_2$)
$O_2$: 1.2% ($1.0\% < O_2 < 1.5\%$)

Other tests can be performed in a similar manner.

It is intended that the present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A remote mixture control device for testing and adjusting internal combustion engines comprising:

(a) a housing being generally rectangular and having a front, a back, a top, and a bottom, said housing also having a plenum cavity extending from the front of said housing to the back of said housing, forming an open channel through the [latitudinal] *longitudinal* center of the housing, said housing also having a venturi port extending from the top of said housing into the plenum, at an oblique angle thereto:

(b) a holding tank integrally formed within said housing, said holding tank also having an inlet port for filling, at least one ventilation port, and at least one outlet port;

(c) a [liquid] *fuel* that is stored in said holding tank for delivery from the remote mixture device into the engine;

(d) a first control valve means within said venturi port to control the flow of [liquids] *fuels* from said holding tank through said venturi port;

(e) a hose removably connected to said tank and said valve means to enable [liquids] *fuels* stored in said holding tank to be transported into said venturi port;

(f) a second control valve means rotatably mounted in said housing to control the [latitudinal [ *longitudinal* flow of air through the plenum;

(g) a third control valve means rotatably mounted within said housing, below said venturi port, downstream of said first valve means to control the flow of air through said venturi port; *and*

(h) nozzle means removably attached to the front of said housing such that said nozzle means covers the plenum and acts to direct the [liquid-air] *fuel-air* mixture from the housing.

2. The remote mixture control device of claim 1 wherein the first control valve means comprises a needle valve assembly.

3. The remote mixture control device of claim 1 wherein the second control valve means comprises:

(a) a cylinder having walls, a length greater than its width and having a hole, passing through the cylinder, perpendicular to the longitudinal axis of said cylinder, said cylinder being rotatably installed within said housing such that said cylinder is placed perpendicularly within the plenum of said housing with respect to the direction of an air flow through said plenum and such that the hole within said cylinder is aligned with said air flow when said control valve is open, and such that said hole in said cylinder is perpendicular to said plenum when the cylinder is turned one quarter turn such that the wall of said cylinder is aligned with said plenum, thereby preventing the air flow through said plenum when said control valve is closed;

(b) handle means fixedly attached to said cylinder to permit free rotation of said cylinder; and (c) locking means to restrain said cylinder within said housing.

4. The remote mixture control device of claim 1 wherein the third control valve means comprises:

(a) a cylinder having walls, a length greater than its width and having ahole, passing through the cylinder perpendicular to the longitudinal axis of said cylinder, said cylinder being rotatably installed within said housing such that said cylinder is placed perpendicularly within the plenum of said housing with respect to the venturi port of said housing and such that the hole within said cylinder is aligned with said venturi port when said control valve is open, and such that said hole in said cylinder is perpendicular to said venturi port when the cylinder is turned one quarter turn such that the wall of said cylinder is aligned with said venturi port, thereby preventing the air flow through said venturi port when said control valve is closed;

(b) handle means fixedly attached to said cylinder to permit free rotation of said cylinder; and (c) locking means to restrain said cylinder within said housing.

5. The remote mixture device of claim 1 wherein said nozzle means comprise:

(a) an outlet having a generally cylindrical shape and having a front portion and a rear portion, said outlet being tapered in the front portion and being threaded in the rear portion.

(b) restraining means fixedly installed within the front portion of said plenum;

(c) a ball slidably placed within said plenum such than said restraining means prevent the free movement of the ball into the rear portion of said plenum;

(d) a spring removably placed in contact with said ball and further being held by said outlet and compressed by said outlet when said outlet is screwed into said housing.

6. The remote mixture control device of claim 1 wherein said [liquid] *fuel* comprises gasoline.

[7. The remote mixture device of claim 1 wherein said liquid comprises a solvent cleaning fluid for use in internal combustion engines.]

*8. A portable and detachable remote mixture control device for adjusting internal combustion engines by adjustably varying the amount of air and fuel to the engine, comprising:*

*a. a portable housing having a plenum cavity which has an inlet and an outlet, the housing further having a venturi port in fluid communication with the cavity;*

*b. a fuel container supportably connected to said housing;*

*c. first control valve means communicating with the venturi port and the fuel container to adjustably vary the flow of fuel from the container into the venturi port;*

*d. second control valve means in fluid communication with inlet to the plenum cavity for adjustbly varying the flow of air through the cavity; and*

*e. third control valve means communicating with the venturi port and the plenum cavity to controllably vary the flow of fuel through the plenum inlet and the plenum cavity.*

*9. A device as defined in claim 8, further comprising:*

*fluid connection means for communicating fluid from the outlet of the plenum cavity to a manifold vacuum port on the internal combustion engine, the fluid connection means having further means for removably connecting the device to the manifold vacuum port of the internal combustion engine.*

*10. A device as defined in claim 9, further comprising:*

*spark arrester-backfire protector means for protecting the device from backfire pressure and sparks from the engine.*

*11. A portable and detachable remote mixture control device for adjusting internal combustion engines by controllably varying the amount of air and fuel to the engine, comprising:*

*a. a portable housing having a plenum cavity with an inlet and an outlet, the housing further having a fuel inlet port in fluid communication with the cavity;*

*b. a fuel container connected to said housing;*

*c. a first control valve communicating with the fuel inlet port and being in further fluid communication with the fuel container and the atmosphere, the first valve being manually adjustable to adjustably vary the amount of fuel provided to the fuel inlet port;*

*d. a second control valve in fluid communication with the inlet to the plenum cavity and the atmosphere, the second valve being manually adjustable to adjustably vary the flow of air through the cavity; and*

*e. a third control valve in fluid communication with the first control valve and the plenum cavity through the fuel inlet port to the plenum cavity, the third valve being manually adjustable to adjustably vary the flow of fuel into the plenum cavity through the fuel inlet port.*

*12. A device as defined in claim 11, further comprising:*

*a fluid connection having a first end in fluid communication with the outlet of the plenum cavity downstream of the first, second, and third valves, and having a second end that is adapted for removable connection to a manifold vacuum port on the internal combustion engine.*

*13. A device as defined in claim 12, further comprising:*

*a check valve located between the plenum cavity and the first end of the fluid connection.*

*14. A device as defined in claim 11, further comprising:*

*means for directing the contents of the plenum away from the housing.*

*15. A device as defined in claim 11, wherein the first control valve comprises a needle valve.*

*16. A device as defined in claim 11, wherein the third control valve is located downstream of the first control valve.*

*17. A device as defined in claim 11, further comprising a spark arrestor-backfire protector.*

* * * * *